March 15, 1960   R. S. LOVELAND   2,928,645
POWER ACTUATED SNAP-ACTING VALVE
Filed June 16, 1958
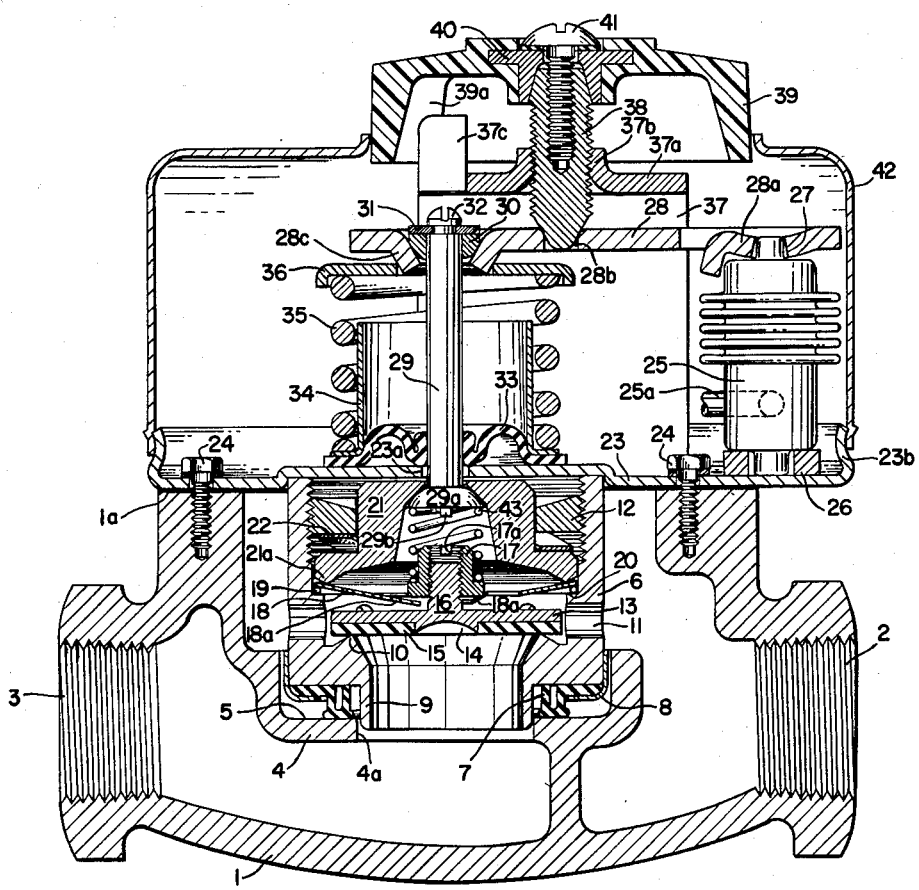
INVENTOR.
ROGER S. LOVELAND
BY
*Alan M. Staubly*
ATTORNEY 2,928,645
         Patented Mar. 15, 1960

2,928,645

POWER ACTUATED SNAP-ACTING VALVE

Roger S. Loveland, Torrence, Calif., assignor to Minneapolis-Honeywell Regulator Company, Minneapolis, Minn., a corporation of Delaware Application June 16, 1958, Serial No. 742,261

5 Claims. (Cl. 251—58)

This invention relates to power operated controls, such as valves, and, more particularly, to means for enabling easy assembly or field adjustment of the actuating mechanism for the controls.

One of the objects of the invention is to provide a valve actuating arrangement wherein an inaccessible adjusting element of the valve mechanism may be readily adjusted by making use of one of the elements of the actuating means as a tool.

Another object of the invention is to provide a thermostatic snap acting valve subassembly wherein an adjusting nut of the snap acting mechanism is adapted to be rotated by means of the actuating plunger of the mechanism by having a tool formed on the end of the plunger.

Other objects of the invention will become apparent upon reading the following detailed description of the invention in conjunction with the accompanying drawing wherein:

The only figure of the drawing is a vertical sectional view through the valve body and actuating mechanism of the valve.

The valve body is generally designated by the reference numeral 1 and has a threaded inlet 2, a threaded outlet 3, and a partition wall 4 between the inlet and outlet. The upper surface of the partition 4 has a machined surface 5 for the reception of a valve subassembly.

The valve subassembly includes a generally cup-shaped valve seat member 6 having a compressible rubber washer 7 at its lower end and held thereon by means of a flanged band 8 that frictionally holds the washer thereon. A skirt portion 9, extending downwardly from the cup-shaped member 6, projects downwardly into an opening 4a in the partition wall 4. The upper end of the skirt portion terminates in an upwardly inclined valve seat portion 10 that provides a knife edge to receive a valve. A plurality of fluid flow openings 11 extend radially through the side wall of the member 6 a short distance above the bottom of the cup-shaped member. The upper end of the member 6 is internally threaded to receive a ring nut 12.

A disc valve head 13 has a slotted boss 14 extending downwardly therefrom and around which a sealing washer 15 is secured to the head. A threaded stem 16 extends upwardly from the head 13 and carries an abutment nut 17. A slot 17a, in the upper end of the nut, enables a flat instrument to screw the nut up and down on the stem 16 to variably position the lower end of the nut with respect to the upper end or surface of the valve disc head. A snap disc 18 rests at its outer periphery on a ring 19, which, in turn, rests on an annular shoulder 20 formed on the inner surface of the member 6. The ring serves as a fixed fulcrum. The snap disc is of washer-shape with three or more inwardly extending arms 18a that engage under the nut 17 to lift the valve off of its seat. A movable pivot or fulcrum member 21 is of generally inverted cup-shape with an annular flange 21a thereon that has a downwardly extending annular knife edge portion which engages the snap disc at a point inwardly of its line of contact with the ring 19. A washer spring 22, positioned between the ring nut 12 and the upper surface of the flange portion 21a, normally biases the fulcrum member 21 sufficiently hard against the snap disc to normally hold the snap disc in its lowermost position with the inner ends of the arms 18a out of engagement with the nut 17.

The means for actuating the pivot or fulcrum 21, so as to operate the valve, consists of a cover plate 23 secured to the top of the valve body, with a gasket 1a therebetween, by means of bolts 24. The plate carries an expandable bellows 25 resting at its lower end in a socket member 26 formed on the plate 23 or secured thereto by any suitable means (not shown). The upper end of the bellows 25 fits in an aperture 27 formed in an arcuate end portion 28a of a lever 28. The bellows is connected through a tube 25a to a temperature responsive bulb (not shown). The lever 28 has a centrally disposed aperture 28b and a downwardly struck and apertured other end portion 28c. A plunger 29 has a rounded head portion 29a at its lower end which bears against the inner surface of the base of the cup-shaped member 21, with the plunger 29 extending through an opening in the bottom or base of the member 21 and through an opening 23a in the plate 23. The head 29a has a transversely extending rib 29b thereon which is adapted to engage in a transversely extending slot 17a in the nut 17, when the plunger 29 is lowered a sufficient amount. The upper end of the plunger 29 carries a rounded head 30 which is secured thereto or held thereon by means of a washer 31 and a bolt 32 screw threaded into the plunger. The head fits into the socket formed by the downwardly struck portion 28c of the lever 28 to provide for some rocking movement. The plunger 29 also extends through a diaphragm seal 33 surrounding the plunger adjacent the plate 23. The outer periphery of the diaphragm seal is clamped to the plate 23 by means of a spring retainer 34 which is resiliently biased against the diaphragm by a compression coil spring 35. The upper end of the spring 35 bears against a spring retaining washer 36 which in turn bears against the lever 38 around the downwardly struck portion 28c.

A bracket 37 of inverted U-shape is secured at its lower ends to the plate 23 by being welded thereto or by any other suitable means. The cross plate 37a of the bracket has an upwardly struck and apertured portion 37b that is threaded and into which an adjusting screw pivot for the lever 28 is screwed. The lower end of the pivot screw 38 is rounded so as to provide for rocking movement of the aperture portion 28b of the lever thereon. The bracket also has an upwardly struck portion 37c which serves as a stop for handle 39 secured to the pivot 38. The handle 39 is made of any suitable material but is illustrated as being made of plastic and having a metal insert 40 which is clamped to the upper end of the screw pivot 38 by means of a bolt screwthreaded into the pivot. The handle also has an inwardly extending rib 39a thereon which serves as an abutment to engage the stop 37c in its extreme adjustment positions.

An inverted cup-shaped cover 42 fits around the adjusting handle and over the actuating means for the valve by having the lower or open end thereof fit over an upwardly extending flange portion 23b of the cover plate 23.

It will be noted that by the removal of the cover 42 and the bolts 24, the valve seat member 6 and the actuating means for the valve is removable as a subassembly. Obviously, the subassembly is easily manufactured or repaired and assembled. As the nut 17 is not accessible for holding and/or turning with respect to the valve head 13, except for small and especially shaped tools that could be inserted through the openings 11 to engage the nut, the provision of the rib 29b on the plunger enables the plunger 29 to be lowered into engagement with the nut 17, with the rib 29b in engagement with the slot 17a of the nut, so that the disc valve 13 may be rotated with respect thereto by inserting a screw driver into the slot 14 and rotating it. By this arrangement, calibration of the position of the nut wtih respect to the snap acting disc may be obtained without having to work through the holes 11. In lowering the plunger 29, a spring 43 positioned between the head 29a of the plunger 29 and the flange on the nut 17 has to be compressed, as does the spring 35, if the adjustment of the nut 17 is being made with the plunger 29 having the head 30 secured thereto and resting against the lever 28. It is thus seen that by the expedient of forming an actuating plunger or stem so as to also function as a tool, considerable assembly time or calibration time is saved in the manufacture or servicing of valves of this type.

*Operation*

The valve is illustrated in its closed position. Upon the temperature of the atmosphere surrounding the bulb (not shown) connected to the bellows 25 falling below the control point of the valve, the bellows 25 will contract and permit the spring 35 to pivot the lever 28 clockwise around the inner end of stem 38. The lever will lift the movable fulcrum 21 by pulling upwardly on the stem 29 against the weaker bias of spring 22. As the fulcrum 21 moves upwardly, relieving the bias on the snap disc or washer 18, a point will be reached where the inherent bias of the snap disc will overcome the weak spring 43 and snap the valve 13 to its open position by the inner ends of the arms 18a lifting upwardly against the bottom of the adjustable nut 17. A reverse action takes place upon a temperature rise at the bulb above the control point of the valve.

As it is obvious that the shape of the nut engaging member 29b and other associated components of the valve may take any number of modifications, the scope of the invention is to be determined from the appended claims.

I claim as my invention:

1. A valve comprising a valve body having an inlet, an outlet, an apertured partition wall therebetween and an opening in an outside wall thereof; a valve and seat assembly having a cylindrical valve seat member engaging said partition wall around the aperture therein, a valve positioned within said member and cooperable therewith to control fluid flow therethrough, said valve having an upwardly extending threaded stem with a nut thereon, valve actuating means in said member having an arm engageable with the under side of said nut, said means having a fulcrum member with an opening therethrough coaxial with said stem, an actuating plunger extending rotatably and slidably through said opening in said means and having a head thereon for lifting said fulcrum member, the adjacent ends of said head and nut having tongue and groove means to enable said plunger to adjust said nut on said stem when the plunger is moved into engagement with said nut and rotated and means normally biasing said plunger head away from said nut; and power means mounted over the opening in the outside wall of said valve body and operably connected to said plunger for lifting and lowering said fulcrum member to actuate said valve.

2. A valve comprising a valve body having an inlet, an outlet, and an opening in an outside wall thereof; a valve seat assembly having a cylindrical valve seat member between said inlet and outlet, a valve positioned within said member and cooperable therewith to control fluid flow therethrough, said valve having an upwardly extending threaded stem with a nut thereon, valve actuating means in said member having an arm engageable with the under side of said nut, said means having a fulcrum member with an opening therethrough coaxial with said stem, an actuating plunger extending rotatably and slidably through said opening in said means and having a head thereon for lifting said fulcrum member, the adjacent ends of said head and nut having tongue and groove means to enable said plunger to adjust said nut on said stem when the plunger is moved into engagement with said nut and rotated and means normally biasing said plunger head away from said nut; and power means mounted over the opening in the outside wall of said valve body and operably connected to said plunger for lifting and lowering said fulcrum member to actuate said valve.

3. A flow control device comprising a body, a flow control member positioned within said body, an actuating plunger rotatably and slidably mounted in said body and having means thereon for actuating said control member, adjustable means on said control member in engagement with said control member actuating means, said plunger having means thereon to adjust said control member adjustable means when the plunger means is moved into engagement with said adjustable means and rotated, and means normally biasing said plunger away from said adjustable means, and power means mounted on said body and operably connected to said plunger for actuating said control member.

4. A valve comprising a valve body having an inlet, an outlet, and an opening in an outside wall thereof, a wall with an opening therethrough providing a valve seat between said inlet and outlet, a valve positioned within said body and cooperable with said seat to control fluid flow therethrough, said valve having an upwardly extending threaded stem with a nut thereon, valve actuating means in said body having an arm engageable with said nut, an actuating plunger extending and rotatably slidably through said valve actuating means and having a head thereon for lifting said means, the adjacent portions of said head and nut having interlocking means to enable said plunger to adjust said nut on said stem when the plunger is moved into engagement with said nut and means normally biasing said plunger head away from said nut; and power means mounted over the opening in said valve body and operably connected to said plunger for lifting and lowering said valve actuating member to actuate said valve.

5. In a valve, the combination comprising a valve body having an inlet and an outlet, an apertured partition wall between said inlet and outlet, an opening in an outside wall of said body, a valve seat around the aperture in said partition wall, a valve positioned within said body and cooperable with said seat to control fluid flow therethrough, valve actuating means in said body having an adjustable connection with said valve, said actuating means having a rotatably and slidably mounted plunger with a head thereon for lifting said valve, a portion of said head having means thereon to enable said plunger to adjust said actuating means when the plunger is moved into engagement with a cooperating portion of said adjustable connection and rotated and means normally biasing said plunger head away from said cooperating portion, and power means mounted over the opening in the outside wall of said valve body and operably connected to said actuating means for lifting and lowering said valve.

References Cited in the file of this patent

UNITED STATES PATENTS

| | | |
|---|---|---|
| 1,697,972 | Farmer | Jan. 8, 1928 |
| 2,724,409 | Coffey | Nov. 22, 1955 |